United States Patent Office 3,203,407
Patented Aug. 31, 1965

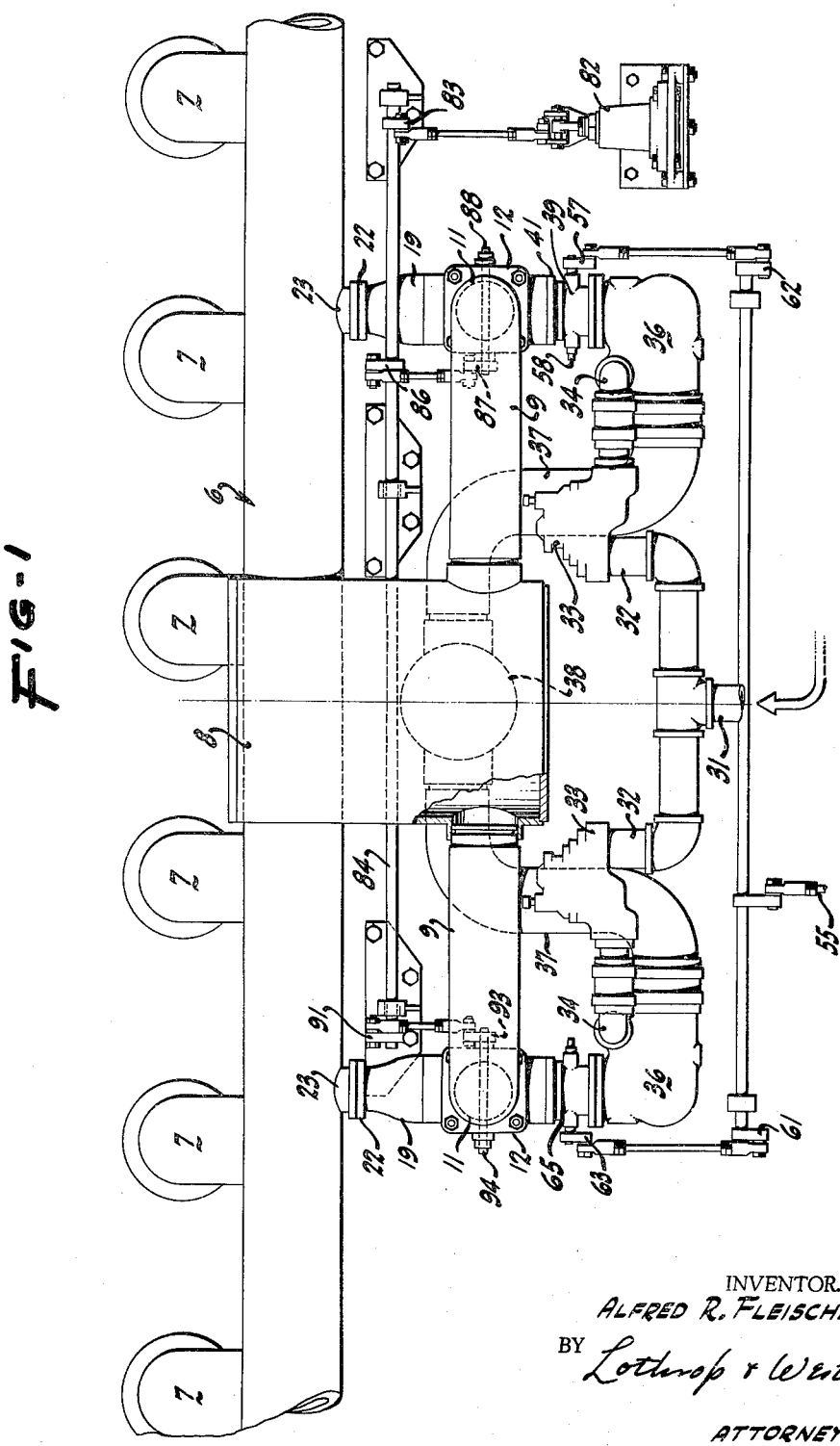

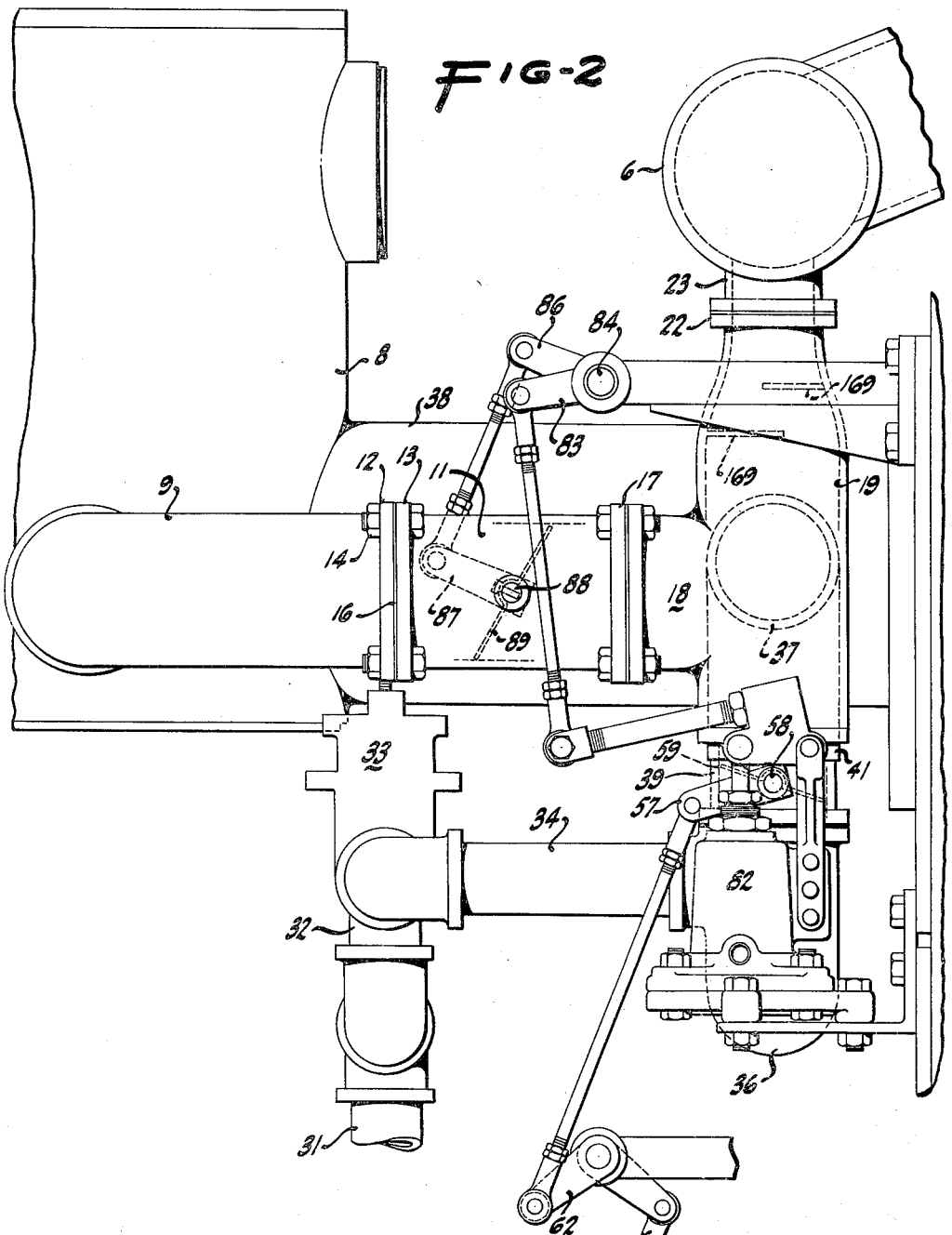

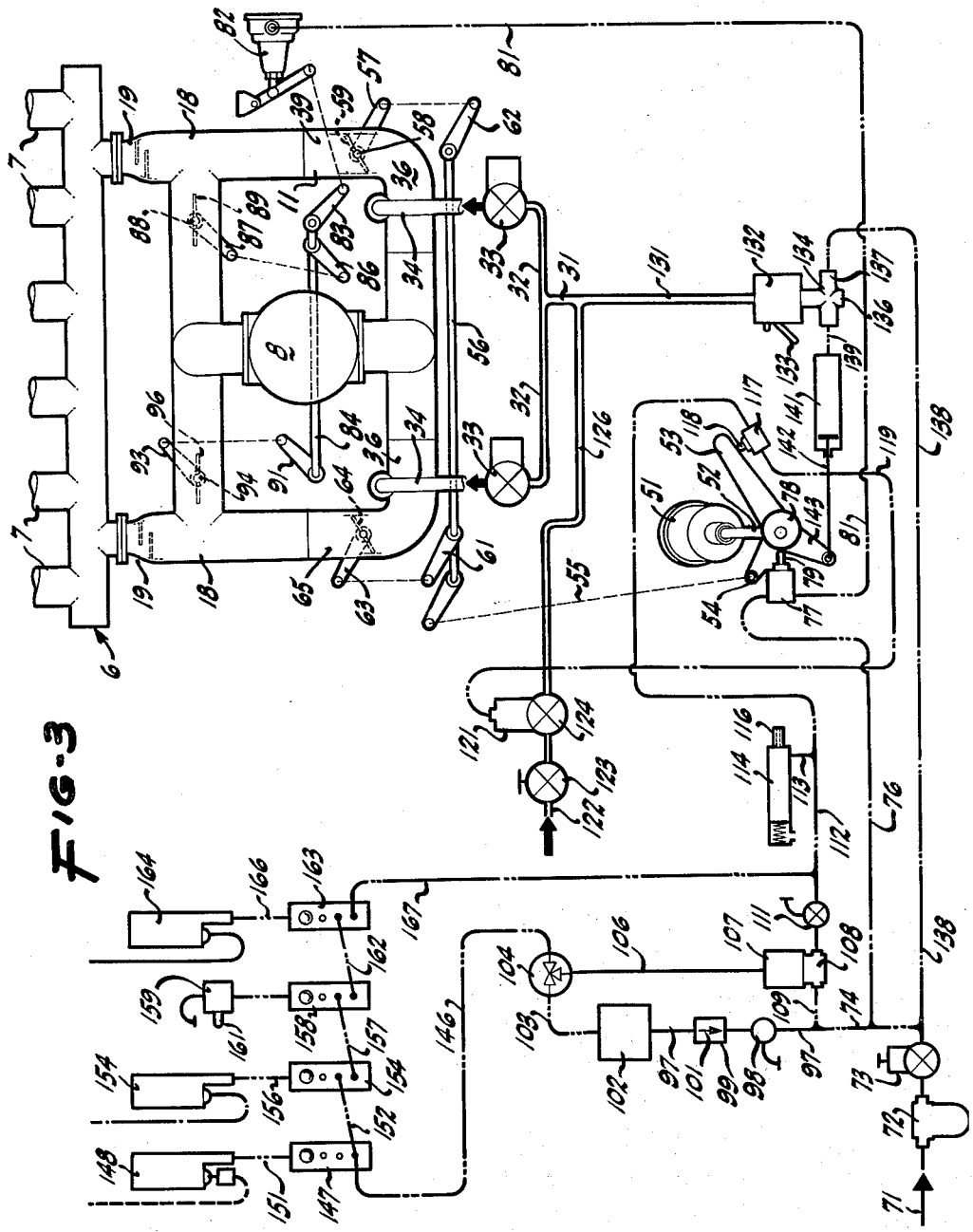

3,203,407
DUAL FUEL SYSTEM FOR A LIQUID FUEL INJECTION ENGINE
Alfred R. Fleischer, Pleasant Hill, Calif., assignor to General Metals Corporation, Oakland, Calif., a corporation of California
Filed June 17, 1963, Ser. No. 288,129
10 Claims. (Cl. 123—27)

My invention relates to means for operating a compression ignition engine on varying proportions of two fuels. The arrangement is such that normally the engine is provided with fuel oil which is injected into the combustion chamber and is ignited by the heat of compression. The amount of fuel injected is either sufficient to take care of the entire load on the engine, or the amount of fuel injected is just sufficient to serve as a pilot igniter for an aspirated gas-air mixture supplied to the engine in addition to the liquid fuel supply. The engine can be operated either as a complete fuel injection engine or as a fuel aspirating engine with appropriate ignition or as any desired intermediate combination of the two. Under most conditions of dual fuel engine operation, there is considerable difficulty in providing an appropriate amount of air for the preferred composition of aspirated gas. Usually there is some deficiency in the aspirated air.

It is therefore an object of the invention to provide a dual fuel system for an injecting and aspirating engine in which both fuels, liquid and gas including air for combustion, are carefully controlled so that appropriate combustion results, no matter on what fuel or combination of fuels the engine is operating.

Another object of the invention is to provide a dual fuel system for an engine in which the operation of the engine on either or both of the fuels is accomplished with satisfactory combustion characteristics without detailed supervision by the operator or user.

Another object of the invention is to provide a dual fuel aspirating system which can readily be adapted to a standard compression ignition injection engine.

Another object of the invention is to provide a dual fuel system which utilizes many parts already available.

An additional object of the invention is to provide a dual fuel system which is simple in concept and operation and can readily be fabricated and serviced economically.

Other objects together with the foregoing are attained in the embodiment of the invention described in the accompanying description and illustrated in the accompanying drawings, in which:

FIGURE 1 is a side elevation of a portion of a liquid fuel injection engine having the dual fuel system of the invention incorporated therewith;

FIGURE 2 is a side elevation to an enlarged scale of the structure shown in FIGURE 1; and FIGURE 3 is a diagram of a dual fuel system as applied to a liquid fuel injection engine together with certain ancillary controls.

The particular engine with which the dual fuel system of the invention is associated is not critical. It is sufficient if the engine is designed for operation on a compression ignition cycle and is capable of receiving variable amounts of liquid fuel by injection into the cylinders at the proper time. Since that environment is well known, the engine itself is not illustrated in detail herein and most of the injection mechanism, also being standard, is omitted for simplicity.

In a usual environment, for example, an engine having six cylinders arranged in line, there is provided an air intake manifold 6 having a number of outlet branches 7 for conducting gases within the manifold into the individual engine cylinders. The manifold 6 is preferably provided with an appropriate supply of atmospheric air (not necessarily at atmospheric pressure) from an intake plenum 8. This may be provided with an appropriate air cleaner, not shown in detail. Atmospheric air from the plenum 8 is dispatched in two symmetrical ways. The present installation for the most part is substantially symmetrical and is duplicated on opposite sides of a center line so that a description of one side of the structure applies equally to the other side thereof.

From each side of the plenum 8 a branch pipe 9 leads into a butterfly housing 11, the connection being made by appropriate flanges 12 and 13 secured by bolts 14 and having an intermediate sealing gasket 16. The butterfly housing is similarly connected at its opposite end by a comparable connecting flange structure 17 to a T-connection 18 opening into an upright conduit 19. The conduit itself is conveniently a casting arranged with its axis substantially vertical and is connected at its upper end by a flange structure 22 to a neck 23 merging with the manifold 6. Considering only this much of the structure, atmospheric air flowing into the plenum 8 is carried by the respective ones of the pipes 9 through the respective butterfly housings 11 into the individual conduits 19 and thus into the engine manifold for transmission to the engine cylinders. The pipe 9, the housing 11, a portion of the connection 18 and the conduit 19 can be considered as a first passageway. If the engine is to operate solely as a liquid fuel injection engine, the air inlet structure can be constituted as just described.

In accordance with the invention, means are provided for supplying the manifold 6 not only with atmospheric air but also with atmospheric air mixed with a combustible gas. In the present instance, gas such as natural gas is available in a conduit 31 under a relatively low pressure, for example, five or six inches of water column, and flows into a branch conduit 32 leading to a pressure regulator 33. This is set so as to even out any fluctuations in pressure of the incoming gas and to establish a uniform discharge pressure. At its outlet the regulator is connected by a conduit 34 to a gas-air carburetor 36. The carburetor itself is a standard aspirating unit capable of mixing atmospheric air and gas together to afford a substantially homogeneous combustible mixture. The carburetor 36 is supplied with atmospheric air through a second conduit 37 constituting a connection between an extension 38 of the plenum 8 and the inlet to the carburetor. From the carburetor the flow of air and natural gas mixture (sometimes referred to as "gas") is through a throttle housing 39 connected to the lower end of the member 19 by means of an appropriate flange connection 41.

If the engine is to operate solely on a carbureted air or a gas-air mixture, the air flow is from the plenum chamber 8 through the extension 38 and through the conduits 37 to the carburetors 36 and the gas then flows into the members 19 for transfer to the manifold 6 and cylinders for combustion. The conduit 37, the carburetor 36, the housing 39 and a portion of the connection 18 can be considered as a second passageway merging with the first passageway.

Means are provided for operating the engine either on liquid fuel injection alone or on a desired proportion of injected liquid fuel and gas-air mixture. As especially shown in FIGURE 3, a fuel control box 51 (which can incorporate a governor to provide an automatic speed governing feature, if desired) has an extended rotary shaft 52 on which a manually actuated lever 53 is mounted. Coupled with the lever 53 by a special linkage forming no part of the present invention is a lever 54 joined by a linkage 55 to an auxiliary shaft 56. A mechanism 62 connects the shaft 56 to a crank 57 on a mixture throttle shaft 58. A mixture throttle disk 59 is located on the shaft 58 and when the shaft revolves is correspondingly turned completely to block flow through the housing 39, or to afford a selected restriction to flow through the housing 39. Since the structure is symmetrical, the auxiliary shaft 56 also is connected by a mechanism 61 to a corresponding lever 63 on a duplicate mixture throttle disk 64 in the symmetrical throttle housing 65. When the lever 53 is rotated with the shaft 52 either under automatic control or by hand, the linkage 55 and the auxiliary shaft 56 as well as the levers 57 and 63 are moved to open or close the mixture throttle disks 59 and 64. In this fashion, by moving the lever 53, the amount of gas-air mixture sent to the intake manifold 6 from the plenum chamber 8 and from the carburetors 36 can be easily controlled.

Means are also provided for governing the amount of air flowing through the throttle housing 11 and its opposite member 65 and in accordance generally with the position of the control lever 53. In this instance, the connection is not a direct mechanical one, but is through a servo device. In the present instance it is preferred to use compressed air as the power medium. Compressed air from a suitable source indicated by an arrow 71 in FIGURE 3 is carried through a filter 72 and a pressure regulator 73 and is discharged into a line 74 having a branch 76. In the branch 76 is situated a pressure controller 77 actuated by a cam 78 on the shaft 52 and abutting against a stem 79 projecting from the controller 77. A connecting line 81 extends from the controller 77 and a servo cylinder 82 appropriately mounted and connected to operate a mechanism 83 including a lever carried on a shaft 84. A linkage 86 joins the shaft 84 to an air throttle lever 87 carried by an air throttle shaft 88 appropriately mounted in the housing 11 and itself carrying an air throttle disk 89. This can be moved as desired between a closed position blocking all flow through the housing 11, and an open position permitting full flow through that housing. Since the installation is symmetrical, the shaft 84 is extended to connect to a linkage 91 joined to a lever 93 on a duplicate air throttle shaft 94 carrying an air throttle 96, the air throttles 96 and 89 operating in unison or conjunction.

With this arrangement and with air pressure suppled to the controller 77, when the lever 53 is one extreme position as shown, corresponding to operation of the engine on liquid fuel injection alone, the controller 77 is in effect shut off so that there is no substantial pressure available in the servo member 82. Correspondingly, the air flow through the members 19 from the plenum as supplied through the air throttle housings 11 and 65 is maximum and is appropriate for operation on full fuel injection. When, however, the lever 53 is moved, that is, rotated counterclockwise as seen in FIGURE 3 to reduce the amount of liquid fuel injected and to increase the amount of gas-air mixture consumed, the cam 78 simultaneously rotates and actuates the pressure controller 77 to increase the pressure in the servo cylinder 82. This correspondingly rotates the mechanism 83 and so correspondingly and partially closes the air throttles 89 and 96.

The servo mechanism, including the conduit 81, serves as a linkage transmitting the position of the lever 53 to a corresponding position of the throttles 89 and 96. While there is a correspondence in position, this need not be a direct, linear correspondence because the cam 78 can be contoured to afford any desired lever and throttle position relationship. Since the lever 54 rotates concurrently with the lever 53 and the rotation of the cam 78, the operation is such as to open the gas-air mixture throttles 59 and 64 as the air throttles 89 and 96 are gradually closed. The arrangement is such, particularly the cam 78 is so contoured, that for any combination of fuels being supplied to the engine the amount of air available for optimum combustion is appropriately supplied.

To assist in the operation of the described mechanism, and particularly to avoid damage to the engine no matter on what fuel or combination of fuels it may be operating, advantage is taken of the compressed air supply to afford a number of control interlocks. Branching from the pipe 74 is a line 97 extending through a vented reset valve 98 designed for momentary manual actuation. The line 97 continues through a one-way flow limiting valve 99 regulating the rate of air flow in one direction as shown by the arrow 101 in FIGURE 3. The air line 97 continues through an accumulator tank 102 to a conduit 103 leading to a double check valve 104. One branch 106 from the double check valve 104 extends to an actuating air chamber 107. This is at the upper end of a diaphragm valve 108 located in a branch air line 109 taking off the line 74 and leading through a manually operable control valve 111 to an air line 112. A lead 113 branching from the line 112 extends to a spring-returned servo cylinder 114 having an extension 116 for shutting off the fuel to the various liquid fuel injectors for the engine cylinders, the spring in emergency stopping the supply of fuel.

The air line 112 continues to a gas shutoff valve 117 having a projection 118 in the path of the lever 53 in one extreme position. The valve 117 is connected by a line 119 to a diaphragm control valve 121 situated in the gas supply line 122. A plug valve 123 is interposed between the source of gas and the control valve 124 regulated by the diaphragm 121. The discharge of the valve 124 is through a pipe 126 connecting to the conduit 31 extending through the regulators 33 to the gas carburetors 36. The gas line 126 has a branch 131 extending to a trigger-set diaphragm valve 132. This has a manually actuated trigger 133 which can be set after each operation of the valve and can be tripped by gas pressure. The actuator 132 controls a three-way air valve 134 having a vent 136 to the atmosphere and an inlet 137 supplied through a pipe 138 with compressed air from the pipe 74. The valve 134 is also connected by a pipe 139 to a servo cylinder 141 having a piston rod 142 joined to a lever 143 on the shaft 52 along with the lever 53 and the lever 54.

From the double check valve 104 there is an air pressure line 146 extending to an indicator and valve 147 responsive to low fuel oil level. A responsive mechanism 148 operates through a line 151 to close the valve 147 whenever the fuel oil level is excessively low and thus stops further air flow. In addition, when the valve 147 closes to stop other air flow, it vents the line 146 to atmosphere.

From the valve 147 a line 152 extends to a low lubricating oil pressure controller 153 having an element 154 responsive to lubricating oil pressure and operating through a line 156 on the responsive element 154. The operation of this structure is similar to that of the valve 147. Similarly, a line 157 extends to an indicator and valve 158 having a mechanism 159 responsive to overspeed of the engine and usually incorporated as part of the governor mechanism. There is an overspeed reset trip 161. The operation of the valve 158 is like that of those previously described. A line 162 extends to a valve 163 responsive to the water jacket temperature or excessively low level of water for the cooling jackets. A controlling mechanism 164 is effective through a line 166 for this purpose. If all of the controlling instrumentalities are in safe condition, air under pressure is connected through them in series and is present in a line 167 joined to the line 112.

It is customary to start a dual fuel engine of this sort with liquid fuel injection only and without any gas-air mixture whatsoever. The starting is customarily by air injection. To start the present engine, the lever 53 is put in the extreme position indicated in FIGURE 3. Air in the line 74 is then available under control of the reset valve 98. When this is manually pressed, air then flows readily through the restricting valve 99 into the accumulator 102 and through the double check valve 104. Pressure is then available in the line 106 and actuates the diaphragm valve 108 so that flow can then ensue from the connecting line 109 into the line 112. Pressure in the line 112 is effective upon the cylinder 114 to retract the extension 116 to permit the supply of injection fuel for starting. Pressure is also available in the line 112 at the valve 117, but when the lever 53 is in its full diesel or full liquid fuel position, air under pressure is blocked at the valve 117 and the line 119 is drained. The diaphragm 121 maintains the gas valve 124 closed and no gas can then be aspirated by the engine. When the lever 53 moves away from full diesel position, the line 119 is charged and the gas valve 124 can open.

A separate control, not shown, is manually operated to rotate the engine, and if the engine fires within a reasonable time after the manual valve 98 has been released, the escape of air in the direction of the arrow 101 is not sufficiently great as to cause the engine to return to shutdown condition. The engine then continues to operate until such time as any of the instrumentalities 148, 154, 159 and 164 exceeds its limit. If that occurs, air flow through the line 167 is interrupted and the line is vented so that the pressure drops to atmospheric and the rack cylinder 114 is spring impelled to shut the engine down. During operation, the lever 53 is shifted out of its full fuel injection position to operate subsequently on some proportion of gas-air mixture. As soon as the lever 53 leaves the projection 118, the line 119 is charged, so that the diaphragm 121 permits the gas valve 124 to open and, presuming that the main plug valve 123 is also open, gas is made available at the carburetors 128 and 36. The amount of gas-air mixture flowing and the amount of air flowing are regulated by the linkage 56 and the line 81 as previously described. Any time during engine operation on gas that the gas pressure becomes deficient in the line 126, there is a corresponding pressure deficiency in the diaphragm chamber 132 which then closes the air vent 136 and connects air pressure from the line 138 into the line 139 and projects the piston rod 142 from the cylinder 141, thus taking over control of the engine and revolving the shaft 52 to restore the engine to full liquid fuel injection and simultaneously shutting off the diaphragm valve 124 so that no gas can be utilized. When gas pressure is again available, it is necessary manually to operate the trip lever 133 so that the valve 134 again connects the line 139 to atmosphere at the vent 136 and the piston rod 142 can retract readily into the servo cylinder 141.

During the normal operation of the engine, the various controls work as described and the lever 53 is manually or automatically controlled in accordance with any desired function to operate the engine on any desired mixture of fuels or either one of them alone. During this time, the carburetor mixture throttles 59 and 64 are appropriately positioned not only in and for themselves, but also relative to the position of the air throttles 89 and 96, preferably under the control of the governor, so that at all times an appropriate air supply is afforded for the engine in accordance with the particular admixture of fuels being utilized.

To assist in supplying the engine with a good gas-air mixture, the upper portion of each member 19 is conveniently provided with a pair of staggered baffles 169 so that the gas-air mixture after it has left the carburetors and as it is going forward the manifold travels in a tortuous path to cause considerable turbulence and to effectuate a homogeneous combustible mixture.

What is claimed is:

1. In a duel fuel system for a multi-cylinder engine of the compression ignition type having a liquid fuel metering injection pump including a control means for varying the amount of fuel charge delivered by said pump to the cylinders of said engine to maintain a predetermined engine speed regardless of the load on said engine, the improvement comprising an intake structure having a plurality of outlets for supplying the individual cylinders of said engine and having an inlet, a plurality of passageways interconnecting said inlet and said outlets, carburetor means located in some of said passageways, others of said passageways forming air by-pass means extending from said air inlet to portions of said intake structure downstream of said carburetor means, mixture throttle means for said carburetor means, air throttle means for said by-pass means operable to restrict the flow therein and produce a variable pressure drop across said carburetor means, and means interconnecting said injection pump control means and said mixture throttle means to move said mixture throttle means and said injection pump control means in inverse relation and to move said air throttle means in inverse relation to said mixture throttle means.

2. A dual fuel system for an engine having liquid fuel injection into the cylinder thereof and having a gaseous fuel inlet into the cylinder thereof comprising means for varying the amount of liquid fuel injected into said cylinder, a first passageway having an upstream end and a downstream end, said first passageway being connected at said downstream end to said gaseous fuel inlet, means forming an air inlet to said first passageway near the upstream end thereof, an air throttle in said first passageway downstream of said air inlet, a second passageway having an upstream end and a downstream end, means forming an air inlet to said second passageway near the upstream end thereof, said second passageway merging at its downstream end with said first passageway downstream of said air throttle, means for supplying gas to said second passageway downstream of said air inlet thereto, a mixture throttle in said second passageway between said gas supplying means and said downstream end thereof, and means for interconnecting said varying means and said air throttle and said mixture throttle to position said air throttle in direct accordance with the position of said varying means and to position said mixture throttle in inverse accordance with the position of said varying means.

3. A dual fuel system for an engine having liquid fuel injection into the cylinder thereof and having a gaseous fuel inlet into the cylinder thereof comprising means for varying the amount of liquid fuel injected into said engine; a first passageway having an upstream end and a downstream end, said first passageway being connected at said downstream end to said gaseous fuel inlet; means forming an air inlet to said first passageway near the upstream end thereof; an air throttle in said first passageway to vary the quantity of air flowing past said air throttle; a second passageway having an upstream end and a downstream end, said downstream end of said second passageway merging with said first passageway downstream of said air throttle; means forming an air inlet to said second passageway near the upstream end thereof; means for supplying gas to said second passageway; a mixture throttle in said second passageway between said gas supplying means and said downstream end thereof to vary the quantity of gas-air mixture flowing past said mixture throttle; means for interconnecting said varying means, said air throttle and said mixture throttle to supply said engine with liquid fuel only, with gas-air mixture only, or with any proportions of liquid fuel and gas-air fuel; and means included in said interconnecting means for changing the effect of said air throttle directly with change in effect of said varying means and inversely with change in effect of said mixture throttle.

4. A dual fuel system for an engine having liquid fuel injection into the cylinder thereof and having a gaseous fuel inlet into the cylinder thereof comprising means for varying the amount of liquid fuel injected into said cylinder; a passageway having an upstream end and a downstream end, said passageway being connected at said downstream end to said gaseous fuel inlet; means for supplying unmixed combustion air to said passageway; means including a gas inlet and an air inlet for introducing a distinct gas-air combustible mixture into said passageway; and means for conjointly operating said introducing means and said supplying means to furnish said gas-air combustible mixture and said unmixed combustion air to said conduit in inverse proportions and for operating said varying means in direct accordance with said unmixed combustion air supplying means.

5. A dual fuel system as in claim 4 in which said operating means is effective to shut off entirely said distinct gas-air combustible mixture from said passageway and said operating means is alternatively effective to shut off entirely said supply of unmixed combustion air from said passageway.

6. A dual fuel system as in claim 4 in which said operating means includes a cam to control the proportion of said distinct gas-air mixture introduced into said passageway relative to said unmixed air supplied to said passageway.

7. A dual fuel system for an engine having liquid fuel injection into the cylinders thereof and having gaseous fuel inlets into the cylinders thereof comprising means for controlling the injection of liquid fuel into said cylinders, a manifold having inlet means and outlet means, said manifold being connected by said outlet means to said gaseous fuel inlets, an atmospheric air cleaner, a first passageway connecting said air cleaner to said inlet means of said manifold, an air throttle in said first passageway between said air cleaner and said manifold, a second passageway connecting said air cleaner to said first passageway downstream of said air throttle, a gas carburetor in said second passageway, a mixture throttle in said second passageway downstream of said gas carburetor, and means for simultaneously varying said injection controlling means and correspondingly moving said air throttle and moving said mixture throttle with opposite effect.

8. A dual fuel system for a liquid fuel injection engine as in claim 7 in which there is provided a turbulent intermixing device including staggering baffles in said first passageway between said air throttle and said manifold.

9. A dual fuel system for a liquid fuel injection engine as in claim 7 in which there is provided a cam for controlling the operation of said air throttle relative to said mixture throttle.

10. A dual fuel system for an engine having liquid fuel injection into the cylinders thereof and having gaseous fuel inlets into the cylinders thereof comprising means for controlling the injection of liquid fuel into said cylinders; a manifold having inlet means and outlet means, said manifold being connected by said outlet means to said gaseous fuel inlets; an air inlet mechanism; a first passageway connecting said mechanism to said inlet means of said manifold; an air throttle in said first passageway between said mechanism and said manifold; a second pasageway connecting said mechanism to said first passageway downstream of said air throttle; a gas carburetor in said second passageway; a gas supply line connected to said carburetor; a flow control valve in said gas supply line; a mixture throttle in said second passageway downstream of said gas carburetor; a controller; and means operated by said controller for varying said injection controlling means, said air throttle, said mixture throttle and said flow control valve.

References Cited by the Examiner
UNITED STATES PATENTS

| | | | |
|---|---|---|---|
| 2,339,988 | 1/44 | Gerson et al. | 123—121 |
| 2,400,247 | 5/46 | Miller et al. | 123—121 |
| 2,714,883 | 8/55 | Metzger | 123—198 |
| 2,954,760 | 10/60 | Hug | 123—27 |
| 3,016,886 | 1/62 | Benz et al. | 123—27 |

MARK NEWMAN, *Primary Examiner.*

RICHARD B. WILKINSON, *Examiner.*